United States Patent [19]

Butler

[11] 3,707,983
[45] Jan. 2, 1973

[54] LIQUID FLOW MONITORING

[76] Inventor: Wilbur T. Butler, P.O. Box 535, Pond Creek, Okla. 73766

[22] Filed: Jan. 11, 1971

[21] Appl. No.: 105,533

[52] U.S. Cl. .................................... 137/173, 73/200
[51] Int. Cl. ............................................. F16k 45/00
[58] Field of Search .......... 137/173, 174, 202, 527.8; 73/200

[56] References Cited

UNITED STATES PATENTS

| 3,330,157 | 7/1967 | Richards | 137/173 X |
| 2,629,448 | 2/1953 | Duggan | 137/527.8 X |
| 2,111,473 | 3/1938 | Hudson | 137/202 |
| 2,217,655 | 10/1940 | Bassett | 73/200 UX |

*Primary Examiner*—Alan Cohan
*Attorney*—Joseph C. Kotarski, Henry H. Huth, Robert B. Coleman, Jr., William J. Miller and Dunlap, Laney, Hessin & Dougherty

[57] ABSTRACT

Apparatus for regulating and monitoring the flow of a liquid/gas fluid mixture such as the type encountered in crude petroleum recovery. The apparatus includes a first expansion enclosure receiving liquid and/or gas input with the first output from said expansion enclosure being applied through a biased valve which allows output flow at greater than predetermined pressures. A second valve member disposed in a second output of the expansion enclosure is operated via a float to close at a predetermined liquid level within said expansion enclosure and to open below such level thereby to allow by-pass flow of gas substance from said second output for later addition to the first output. Flow monitor means responsive to the position of said first valve means provides a flow time indication and/or output record.

7 Claims, 2 Drawing Figures

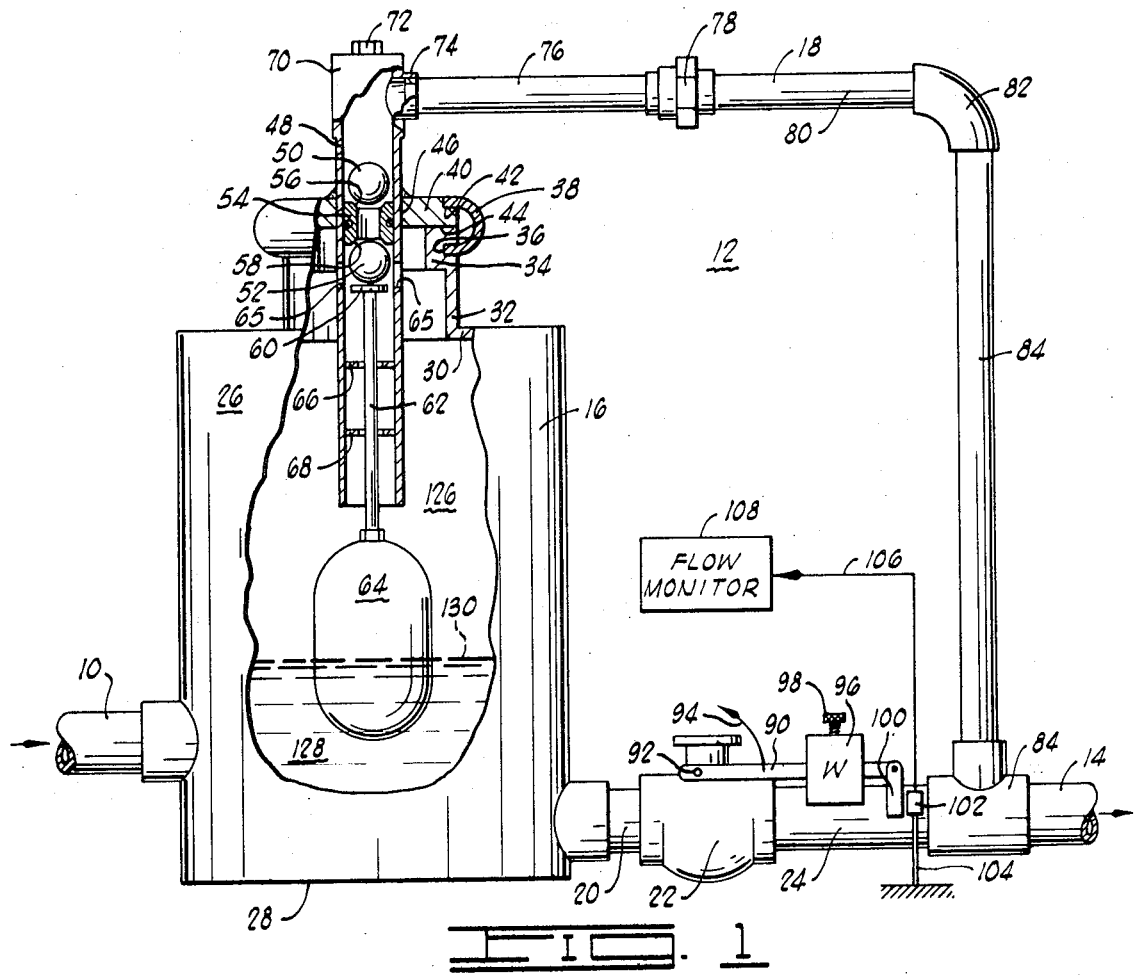
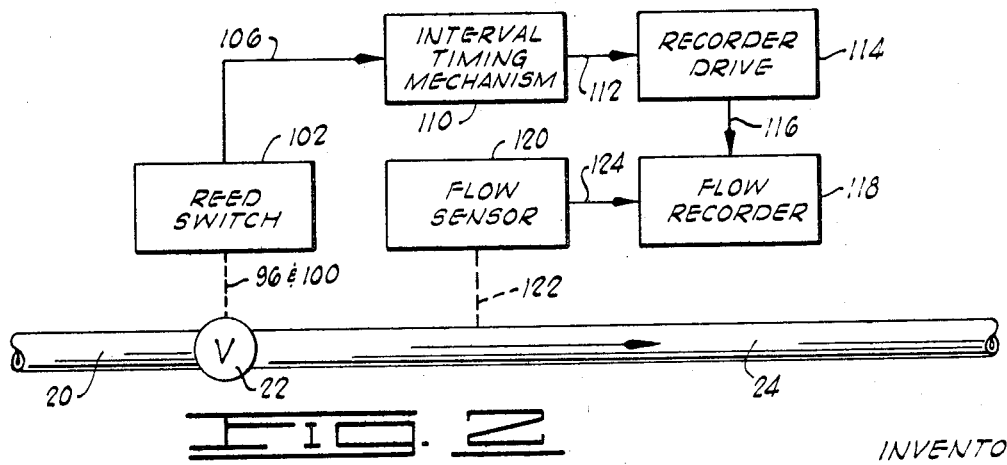

LIQUID FLOW MONITORING

BACKGROUND OF THE INVENTION

1. Field of the Invention

The invention relates generally to flow indicating devices for fluid conduits and, more particularly, but not by way of limitation, it relates to improved flow/no-flow indicating apparatus for use in automatic oil lease surveillance and monitoring systems.

2. Description of the Prior Art

The prior art includes various types of automatic and manually controlled valve assemblies which are used for regulation of fluid output from well heads and the like. In the main, the prior art devices include no designs wherein they are able to distinguish between liquid and gas flow through the output conduit, and such inability often results in false flow signals due to continued gas production through the output line after the well ceases to pump liquid. Further, several prior designs have been found to be very susceptible to sticking in the open or full flow position thereby to render any flow indication erroneous. Such flow valve sticking condition is especially troublesome in parrafin producing areas, and many typical installations include an additional check valve at the flow line header to guard against such sticking and false generation of flow indication. An example of prior art flow monitor of different type is described in the U. S. Pat. No. 3,392,580 in the name of Bain. This device is of a significantly different structure and function from the invention as described herein.

SUMMARY OF THE INVENTION

The present invention contemplates a control valve for a liquid flow line which is capable of passing liquid above a predetermined line pressure while allowing gas product by-pass during flow and/or no-flow line condition. The apparatus consists of an enclosure connected in the liquid line to receive input therefrom and to provide first and second outputs, a first output provides liquid flow to a weight-biased output valve to allow intermittent communication to an output liquid line; the second enclosure output is controlled by a float valve responsive to a predetermined level of liquid within the enclosure to allow flow of gas product by by-pass conduit for subsequent connection back into the output liquid line. Flow monitoring apparatus responsive to the position of the weight-biased valve provides an indication of the flow/no-flow condition of the liquid flow line.

Therefore, it is an object of the present invention to provide a flow indicating device which generates reliable indication for all producing conditions including wells that produce very low liquid volumes with gas/oils ratios which extend over an extremely wide range.

It is a further object of the present invention to provide an apparatus for gas-liquid separation which is designed to by-pass all gas in the event of a no-flow liquid condition.

It is yet another object of the present invention to provide a liquid line flow valve which is simple yet positive and which will also act as a flow line check.

Finally, it is an object of the present invention to provide a flow regulation and recording apparatus which is inexpensive yet highly reliable in operation, and which effectively combats a common problem of failure to indicate a fluid flow line closed in the no-flow condition.

Other objects and advantages of the invention will be evident from the following detailed description when read in conjunction with the accompanying drawing which illustrates the invention.

BRIEF DESCRIPTION OF THE DRAWING

FIG. 1 is an elevation with sectional parts shown in cut-away of the fluid flow regulating apparatus of the invention; and FIG. 2 is a block diagram of flow monitor apparatus constructed in accordance with the invention.

DETAILED DESCRIPTION OF THE PREFERRED EMBODIMENTS

Fluid flow such as a mixture of crude oil liquid and gas substance recovered from an oil well is present in an input conduit 10 for input to a flow regulation device 12 which, in turn, is connected to an output flow conduit 14. The flow regulation device 12 further consists of a liquid chamber 16, a gas by-pass conduit 18 and a liquid flow pipe 20 connected to a flow valve 22 which provides output to a pipe 24 and output conduit 14.

The chamber 16 may be such as a cylindrical tank having a side wall 26 and base plate 28 with a top cover member 30 secured thereover as by welding to provide a gas-tight sealed enclosure. The cover member 30 may include such as a cylindrical neck portion 32 which is formed with an inner annular flange 34, and which includes a groove 36 for receiving one side or annular edge of a groove coupling 38 of standard type. A cover plate 40 including an annular shoulder 42 then receives an opposite annular edge of groove coupling 38 to maintain over plate 40 in tightly-sealed relationship to an upper surface 44 of neck portion 32.

The cover plate 40 is formed with a central hole 46 through which a pipe member 48 is received perpendicularly therethrough and secured as by welding to provide a sealed joinder. The pipe member 48 houses a check valve assembly which consists of upper and lower valve balls 50 and 52 coactively positioned adjacent a valve seat 54 secured thereacross and having both upper and lower valve seats 56 and 58 for receiving respective valve balls 50 and 52. The upper valve ball 50 serves a check function as force of gravity will maintain the valve ball 50 down against seat 56; however, lower valve ball 52 is only urged into closing relationship with valve seat 58 when so forced by pusher pad 60 secured to the end of a shaft 62 which, in turn, is supported by a float 64, a hollow bulb or such of conventional design. A plurality of gas escape orifices 65 are formed in pipe member 48 just beneath the valve seat 54. The lower end of pipe member 48 includes a pair of annular shoulders 66 and 68 secured therein in spaced relationship, shoulders 66 and 68 serving to maintain the shaft 62 and bulb 64 in freely sliding, captive alignment beneath valve ball 52.

The upper end of pipe member 48 includes a cap portion 70 which may include a vertically disposed threaded screw 72 to allow cleaning or access, as well as an outlet 74 which connects gas flow to by-pass conduit 18. The by-pass conduit 18 may consist of standard pipe and fittings suitable for oil field use or other material as may be adapted for whatever the particular application. A pipe section 76 is secured within outlet 74 and joined via connector 78 through pipe section 80, elbow 82, and a pipe section 84 to a pipe coupling 86 which connects into the outlet line 14. The size and type of pipe connection constituting by-pass conduit 18 is not critical, especially in view of the fact that the flow indication device 12 is not designed for efficient gas separation during normal flow conditions and it need only by-pass gas pressure in the event of the liquid no-flow condition.

The liquid outlet pipe 20 applies liquid flow to the valve 22 which may be any of the well-known types of gate valve. In this particular case, the valve 22 is shown as a swinging-type check valve for variable flow control in response to position of a lever arm 90, connected to a valve operating shaft 92, which is operable to open the valve when moved in the direction of arrow 94. Thus, counterclockwise movement of lever arm 90, and therefore rotation of operating shaft 92, may be either directly coupled or it may include gear drive arrangement at a selected ratio to actuate or move the valving member (not shown) within valve 22 to allow incrementing amounts of liquid to flow therethrough. The valve actuating lever is biased in the clockwise direction by means of a weight 96 whice is adjustable by a thumb screw 98 along the length of lever 90 thereby to vary the amount of bias applied to valve 22. This amount of weight bias serves to set the amount of forward pressure to begin opening of the valve 22, as will be further described below.

A magnet member 100 is suitably suspended as by hinged connection from the end of lever 90 to provide an actuating power source for a magnetically responsive reed switch 102, as suspended by a suitable support 104 and providing electrical output via lead 106 to a flow monitor apparatus 108 of conventional type. Referring also to FIG. 2, the condition of valve 22 is apparent from the linkage afforded by lever arm 90 and magnet 100 (shown by dash line in FIG. 2) to provide actuation of reed switch 102 with output via line 106 to an interval timing mechanism 110. The interval timing mechanism serves to sense output on lead 106 and, in the event the well does not produce liquids during a predetermined time interval, an output is applied via line 112 as a no-flow signal indication. Thus, in the case as shown in FIG. 2, a recorder drive stage 114 may be de-energized to provide no energization via line 116 to a flow recorder 118. A suitable form of flow sensor 120, in contact as shown by dash line linkage 122 with liquid flow through conduit 24, may be utilized to sense flow volume and provide an output indication via lead 124 to flow recorder 118. It should be understood that there are many types of flow recording and control apparatus which may be utilized in conjunction with the flow regulation device 12 of FIG. 1.

OPERATION

The fluid being monitored is present in input conduit 10 and enters the interior 126 of chamber 16, as denoted by liquid 128 having a surface 130. With input flow of liquid, the liquid level or surface 130 will rise and the produced fluids will attempt to by-pass through by-pass conduit 18 due to the additional pressure required to open valve 22 as exerted by bias of lever weight 96. Thus, gas components will pass through orifices 65 in pipe member 48 for by-pass through by-pass conduit 18 until the liquid surface 130 carries the float 64 up sufficiently far enough to force valve ball 52 into sealing engagement within valve seat 58. Further, either before or after closure of the by-pass valve ball 52, depending upon bias setting, liquid pressure within liquid volume 128 will exceed the weight-bias of valve 22 thereby to open valve 22 and allow flow of liquid into the output conduit 14. Also, at this time, lever arm 90 is moved in a counterclockwise direction to position magnet 100 relative to reed switch 102 such that the reed switch is actuated to provide an output via line 106 to flow monitor 108 thereby to give proper indication as to the flow condition. All liquid input to liquid body 128 will be forced to exit through output conduit 20, and it will periodically open the valve 22 as the well produces and to provide an output flow with selected record thereof. The valve 22 will make and break the magnetic reed switch 102 as it opens and closes thereby to allow the production liquid output to flow therethrough.

In the event that the well does not produce liquids during a predetermined time interval, the reed switch 102 will not make and a no-flow signal will be output on lead 106 to flow monitor 108. The time interval may be dependent upon the no-flow scan cycle setting, e.g., as set into the interval timing mechanism 110.

In the event that the well continues to produce gas but is not producing further liquids, the biasing should allow gas to displace sufficient liquids from the liquid volume 128 within chamber 16 thereby to allow float 64 to drop and release valve ball 52 from its valve seat 58. The valve ball 52 and valve seat 58 will remain open and by-pass all gas production during the particular condition. Thereafter, when liquid production is resumed, the liquid level or surface 130 will be raised to raise float 64 and close the by-pass valve ball 52 and valve seat 58 such that a flow condition signal will again be monitored when production of liquids is again directed through the valve 22.

The foregoing discloses a novel flow regulating device which may be utilized in various applications wherein a combination of liquid and gaseous products flow through a conduit in varying concentrations and mixtures. While the specification has been particularly directed to the flow of crude oil and natural gas content therein, it should be understood that there are many chemical processing and other industrial applications which may utilize such flow regulating device when there is involved the combined flow of both liquid and gaseous product.

Changes may be made in the combination and arrangement of elements as heretofore set forth in this specification and shown in the drawings, it being understood that changes may be made in the embodiments disclosed without departing from the spirit and scope of the invention as defined in the following claims.

What is claimed is:

1. Apparatus for regulating flow of fluid having both liquid and gas components, comprising: enclosure means having an input connection for receiving said fluid and sharing first and second output connections, first valve means sealingly disposed in said first output connection, said first valve means being normally open to flow of gas out from said enclosure means, second valve means sealingly disposed in said second output connector, said second connection valve means being biased closed against flow of liquid from said enclosure means, float means including actuating means coacting with said first valve means, said float means being disposed to float in the liquid within said enclosure means thereby to actuate said first valve means in accordance with float level, and by-pass conduit means connected to receive gas from said first output connection and to lead said gas to the second output connection while by-passing said second valve means, wherein said second valve means includes: swinging-type check valve means including a lever actuator, weight means adjustably affixed along said lever to assert predetermined bias force maintaining the valve means closed, magnet means affixed to said lever actuator, reed switch means secured at a position adjacent the arcuate travel of said lever actuator at a position where the valve is closed to provide a control output, and flow monitor means controlled in response to said control output.

2. Apparatus as set forth in claim 1 wherein said first valve means comprises:
   stop valve means including a valve seat member having first and second valve seats affixed across said first output connection, and first and second valve balls each movably disposed adjacent said respective first and second valve seats, said second valve ball being supported by said float means actuating means.

3. Apparatus as set forth in claim 2 wherein:
   said valve seat member is vertically oriented and said first and second valve balls are upper and lower, respectively, such that the first or upper ball acts as a gravity actuated check valve.

4. Apparatus as set forth in claim 1 wherein said float means comprises:
   hollow bulb means floatable in said liquid; and
   rod means having a pusher pad on one end in coating contact with said first valve means and having the opposite end affixed to said float means.

5. Apparatus as set forth in claim 4 which is further characterized to include:
   elongated guide means secured beneath said first valve means to extend therefrom while encompassing said rod means and pusher pad thereby to maintain the rod means in proper coactive relationship with said first valve means.

6. Apparatus as set forth in claim 1 which is further characterized to include:
   interval timing means for generating a no flow indicating signal output in response to detection of said control output indicating valve closure for greater than a predetermined time.

7. Apparatus as set forth in claim 6 wherein said first valve means comprises:
   stop valve means including a valve seat member having first and second valve seats affixed across said first output connection, and first and second valve balls each movably disposed adjacent said respective first and second valve seats, said second valve ball being supported by said float means actuating means.

\* \* \* \* \*